US012447566B2

United States Patent
Liu et al.

(10) Patent No.: US 12,447,566 B2
(45) Date of Patent: Oct. 21, 2025

(54) DEVICE FOR REPAIRING A TOP COVER OF A HYDRO TURBINE BY ADDING OR REMOVING MATERIALS

(71) Applicants: China Yangtze Power Co., Ltd., Wuhan (CN); Wuhan Digital Design and Manufacturing Innovation Center Co., Ltd., Wuhan (CN)

(72) Inventors: Hui Liu, Wuhan (CN); Tao Wu, Wuhan (CN); Lin Zhou, Wuhan (CN); Cencen Yang, Wuhan (CN); Ming Ma, Wuhan (CN); Zaiming Geng, Wuhan (CN); Jian Deng, Wuhan (CN); Xiaolong Yang, Wuhan (CN); Jie Yang, Wuhan (CN); Kui Huang, Wuhan (CN); Xiaoping Zhang, Wuhan (CN)

(73) Assignees: China Yangtze Power Co., Ltd., Wuhan (CN); Wuhan Digital Design and Manufacturing Innovation Center Co., Ltd., Wuhan (CN)

( * ) Notice: Subject to any disclaimer, the term of this patent is extended or adjusted under 35 U.S.C. 154(b) by 0 days.

(21) Appl. No.: 18/891,139

(22) Filed: Sep. 20, 2024

(65) Prior Publication Data

US 2025/0128365 A1 Apr. 24, 2025

Related U.S. Application Data

(63) Continuation of application No. PCT/CN2024/103068, filed on Jul. 2, 2024.

(30) Foreign Application Priority Data

Oct. 19, 2023 (CN) .......................... 202311352233.3

(51) Int. Cl.
B23P 6/00 (2006.01)
B23P 23/04 (2006.01)

(52) U.S. Cl.
CPC .................................. B23P 6/002 (2013.01)

(58) Field of Classification Search
CPC ................................. B23P 6/002; B23P 6/007
See application file for complete search history.

(56) References Cited

U.S. PATENT DOCUMENTS 11,407,077 B2 * 8/2022 Chen ...................... B24B 37/10

FOREIGN PATENT DOCUMENTS

| CN | 216858783 U | * | 7/2022 | ................ B23P 6/00 |
| CN | 116441851 A | * | 7/2023 | ................ B23P 6/00 |
| CN | 116550990 A | * | 8/2023 | ............. B22F 10/25 |

OTHER PUBLICATIONS

English Machine Translation of CN-116441851-A (Year: 2023).*
English Machine Translation of CN-116550990-A (Year: 2023).*
English Machine Translation of CN-216858783-U (Year: 2022).*

* cited by examiner

Primary Examiner — Sarang Afzali

(57) ABSTRACT

A device for repairing a top cover of a hydro turbine by adding or removing materials includes a rotating support base, a connecting arm, a movable frame, and a machining assembly. The rotating support base includes a base and a rotating seat disposed on the base, a driving assembly is disposed on the base, and an output shaft of the driving assembly is drivably connected to the rotating seat. An end of the connecting arm is connected to the rotating seat, and the other end of the connecting arm is connected to the movable frame. A lifting plate is disposed on the movable frame, a sliding table assembly and a measuring system are disposed on an upper side of the lifting plate. A swivel seat is disposed on an upper side of the sliding table assembly, and the machining assembly is detachably mounted on the swivel seat.

14 Claims, 7 Drawing Sheets

DEVICE FOR REPAIRING A TOP COVER OF A HYDRO TURBINE BY ADDING OR REMOVING MATERIALS

CROSS-REFERENCE

This application is a continuation of International Patent Application No. PCT/CN2024/103068, filed Jul. 2, 2024, which claims the priority of Chinese Patent Application No. 202311352233.3, filed Oct. 19, 2023, both of which are herein incorporated by reference in their entirety.

TECHNICAL FIELD

The disclosure relates to the field of repairing and processing technology for a top cover of a hydro turbine, and particularly to a device and method for repairing a top cover of a hydro turbine by adding or removing materials.

BACKGROUND

A top cover, as one of the most important overflow components of a hydro turbine generator unit, is subject to long-term cavitation erosion by water flow during the operation of the unit. Many cavitation pits are formed on the overflow surface, which brings great hidden dangers to the safe operation of the unit. The top cover has a large size, with a diameter of up to 10 meters. The traditional repairing method is to first disassemble the top cover, then transport it to the workshop for maintenance, and deal with it by traditional manual grinding and manual welding. The method not only has a high labor intensity, poor working environment, and high safety risks of manual operation, but also the welding quality of the top cover and the grinding effect are not satisfactory. The method cannot well control the quality of the top cover repair, with low grinding flatness and large size accuracy error. At present, the top cover still faces the situation of extensive damaged areas, deep cavitation depth, and large maintenance workload.

SUMMARY

The technical problem of the disclosure aims to solve the problems present in the background by providing a device for repairing a top cover of a hydro turbine by adding or removing materials. The device is driven by a rotating support base to turn a movable frame, on which a machining assembly is installed. It can replace different types of machining assemblies for processing the top cover, resulting in high-quality repairs. The use of machinery instead of manual labor reduces the labor intensity for personnel, improves the working environment, and significantly reduces the safety risks associated with manual operations.

Another technical problem of the disclosure aims to provide a method for repairing a top cover of a hydro turbine by adding or removing materials by using the device.

To solve the above problems, a device for repairing a top cover of a hydro turbine by adding or removing materials is provided.

The device includes a rotating support base, a connecting arm, a movable frame, and a machining assembly. The rotating support base includes a base, a rotating seat and a driving assembly, the rotating seat is disposed on the base, the driving assembly is disposed on the base, and an output shaft of the driving assembly is drivably connected to the rotating seat. An end of the connecting arm is connected to the rotating seat, and the other end of the connecting arm is connected to the movable frame. The movable frame includes a lifting plate, a sliding table assembly, a measuring system, and a swivel seat. The sliding table assembly and the measuring system are disposed on an upper side of the lifting plate. The swivel seat is disposed on an upper side of the sliding table assembly, and the machining assembly is detachably mounted on the swivel seat.

In an embodiment, the base is a frame structure, a bottom of the base is provided with multiple adjustable feet, an outer side of the bottom of the base is provided with multiple fixed feet, the driving assembly is disposed on an upper side of an interior of the base, and a counterweight is placed on a lower side of the interior of the base.

In an embodiment, the driving assembly includes a motor mounting frame, a first motor, and a driving gear. The motor mounting frame is disposed on an upper side of an interior of the base, the first motor is disposed on a lower side of the motor mounting frame, the driving gear is disposed on an upper side of the base, and the driving gear is drivably connected to an output shaft of the first motor. The rotating support base further includes a driven gear, a first torque sensor, and an encoder. The driven gear is disposed on the upper side of the base through a shaft, the driven gear meshes with the driving gear, the rotating seat is located on an upper side of the driven gear. The encoder is disposed on the upper side of the interior of the base, and a shaft of the encoder is connected to a shaft of the driven gear. The first torque sensor is disposed in the rotating seat, and the rotating seat is fixedly connected to the driven gear through the first torque sensor.

In an embodiment, a number of the connecting arm is multiple, the multiple connecting arms are connected through docking bolts.

In an embodiment, the movable frame includes a frame body, trundles and a control cabinet. The trundles are disposed at a bottom of the frame body, and the control cabinet is disposed at a side of the frame body.

In an embodiment, the movable frame includes a support frame, a support plate, guide shafts, a first ball screw, a second motor, and a first nut. The support frame is disposed at a bottom of the lifting plate, the support plate is disposed at a bottom of the support frame, the guide shafts are longitudinally disposed at four corners of the support plate, and the support plate is slidably mounted on the guide shafts. The first ball screw is arranged longitudinally, the second motor is arranged longitudinally, and an output shaft of the second motor is drivably connected to an end of the first ball screw. The first nut is disposed on the support plate, and the first nut is threaded onto the first ball screw.

In an embodiment, the sliding table assembly includes two guide rails, four sliders, a third motor, a second ball screw, and a second nut. The two guide rails are disposed on the lifting plate, each guide rail is provided with two of the four sliders, the swivel seat is disposed on the four sliders, and an output shaft of the third motor is drivably connected to an end of the second ball screw. The second nut is disposed on a bottom of the swivel seat, the second nut is threaded onto the second ball screw, and the swivel seat is driven by the third motor to be capable of moving along a rotational radius of the movable frame.

In an embodiment, the swivel seat includes a baseplate, a fourth motor, a driving gear, a driven gear, a second torque sensor, a connecting plate, and a positioning component. The fourth motor is disposed on a lower side of the base plate, and an output shaft of the fourth motor extends upward from the base plate. The driving gear is disposed on an upper side of the base plate and disposed at the output shaft of the fourth motor. The driven gear is disposed on the upper side of the base plate through a shaft, and the driven gear meshes with the driving gear. The second torque sensor is disposed on an upper side of the driven gear, the connecting plate is disposed on an upper side of the second torque sensor, the positioning component is disposed on connecting plate, and the machining assembly is disposed on the connecting plate.

In an embodiment, the machining assembly includes a grinding component tool, a laser cladding component tool, and an arc additive component tool.

A method for repairing a top cover of a hydro turbine by adding or removing materials using the above device includes steps as follows:

S1, placing at least three support columns on ground with a diameter smaller than of the top cover, where upper sides of the at least three support columns are on a same horizontal plane;

S2, disassembling and lifting the top cover onto the at least three support columns, where the at least three support columns support the top cover without interfering with a repair are located at an edge on a lower side of the top cover;

S3, determining a center of the lower side of the top cover based on a diameter of the top cover, and marking the center of the lower side of the top cover;

S4, transporting the rotating support base to a bottom of the top cover, aligning a rotation center of the rotating seat with the center of the lower side of the top cover, and then fixing the rotating support base;

S5, pushing the movable frame to the lower side of the top cover to close to the edge of the top cover, and bolting the end of the connecting arm to the rotating seat, and bolting the other end of the connecting arm to the movable frame;

S6, adjusting a height of the lifting plate to allow the measuring system to measure and observe the repair area, followed by activating the driving assembly to drive the rotating seat to rotate, thereby driving the movable frame to rotate through the connecting arm; performing circular scanning and mapping data on the repair area located at the edge on the lower side of the top cover by the measuring system to obtain scanning and mapping data, and then controlling a control system to plan a process route based on the scanning and mapping data;

S7, after performing circular scanning and mapping data by rotating the measuring system for one full circle, turning off the driving assembly, installing the machining assembly on the swivel seat, at this time, the machining assembly using a grinding component tool, adjusting a position of the lifting plate to make the grinding component tool be in contact with the repair area, and rotating the grinding component tool to grind according to the process route planned by the control system; during the grinding, mapping data in real time through measuring system to make the control system automatically compensate and correct the process route based on deviation values received from feedback; and making the swivel seat rotate to adjust a grinding angle of the grinding component tool, and using the sliding table assembly to adjust a grinding position of the grinding component tool;

S8, after the grinding by rotating the grinding component tool for one or more full circles, turning off the driving assembly, descending the lifting plat, disassembling the grinding component tool on the swivel seat, installing an arc additive component tool on the swivel seat, and then lifting the lifting plate to a preset position; turning on the driving assembly and performing an arc additive process on the repair area of the top cover, followed by planning a process route by the control system and controlling a feed speed and an amount of arc welding wire by the control system to meet requirements of the arc additive process; and S9, after performing the arc additive process by rotating the arc additive component tool for one or more full circles, turning off the driving assembly, descending the lifting plate, disassembling the arc additive component tool on the swivel seat, installing a laser cladding component tool on the swivel seat, and then lifting the lifting plate to the preset position; turning on the driving device and performing a laser cladding process on the repair area of the top cover; and using the control system to plan the process route, measure a thickness of the cladding layer in real-time, and compare the measured thickness with a cladding layer thickness requirement to control an amount of powder feeding.

The beneficial effects of the disclosure are as follows.

1. The base is used to secure a central position, the driving assembly is used to rotate the rotating seat, the rotating seat drives the movable frame to rotate through the connecting arm, and the lifting plate can be lifted and descended to adjust a height of the machining assembly. The sliding table assembly allows the swivel seat to move along the rotational radius direction of the movable frame, thereby adjusting a processing position of the machining assembly. The swivel seat can rotate to adjust a processing direction of the machining assembly. The measuring system is used to map and determine the position, size, and depth of defects in the repair area. During processing, the lifting plate can adjust the height of the machining assembly in real time through a real-time detection by the measuring system, thereby eliminating height errors caused by uneven terrain. The machining assembly is disposed on the movable frame, and different types of the machining assemblies can be taken to process the top cover. Repairing the top cover with the device of the disclosure results in high-quality and high-precision repairs. The use of machinery instead of manual labor reduces the labor intensity for personnel, improves the working environment, and significantly reduces the safety risks associated with manual operations.
2. The modular design of the disclosure allows the device to be divided into several units, each of which can be independently transported to the location of the top cover and then be assembled for use, making it convenient for both transportation and assembly.
3. The device of the disclosure has a wide range of use. Depending on the need for adding or removing the materials to repair the size of the top cover, the corresponding high-strength rotating connecting arms of different length specifications can be matched to meet the process repair requirements of the top covers with different sizes, thereby keeping other independent modular units unchanged.
4. The assembly of the device is quick and convenient, each independent unit has a quick-connection interface at the connection points, facilitating easy operation and assembly by personnel without the need for extensive adjustments to meet the precision requirements for use.
5. The disclosure reduces the labor intensity for personnel and improves the working environment, the device is used for grinding, laser cladding, and arc additive repair of the top cover, thereby to replace manual repair work.
6. The quality of repair in the disclosure is excellent, using a portable device for repairing the top cover by adding or removing the materials in-situ. Compared to manual repair, the device has a stable structure and precise route control of the terminal process components, which ensures that the top cover surface is repaired evenly with good consistency.

Figure 1:
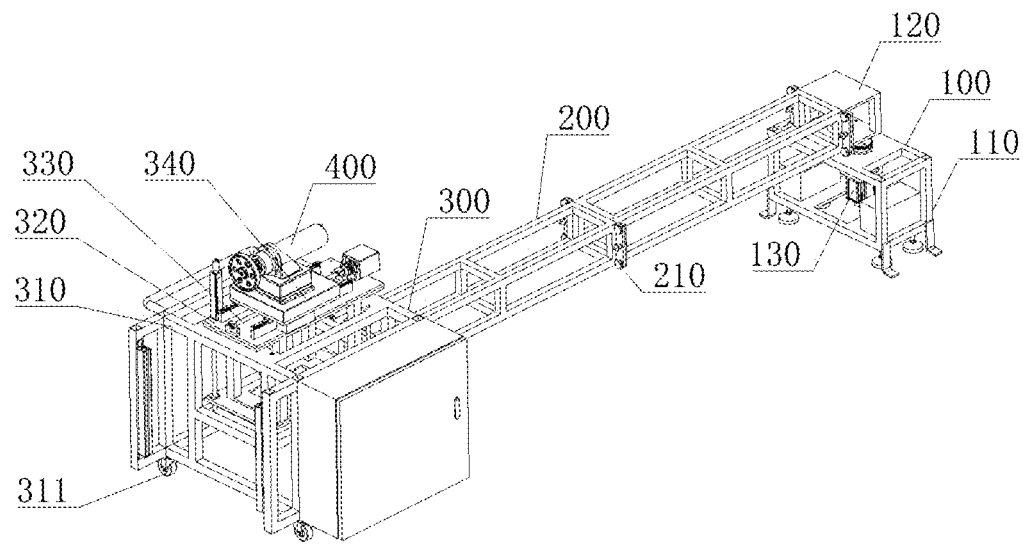
FIG. 1 illustrates a schematic three-dimensional structural diagram of a device in the disclosure.

DESCRIPTION OF REFERENCE NUMERALS 100. rotating support base; 110. base; 111. adjustable foot; 112. fixed foot; 120. rotating seat; 121. first torque sensor; 122. driven gear; 123. encoder; 130. driving assembly; 131. motor mounting frame; 132. first motor; 133. driving gear; 140. counterweight; 200. connecting arm; 210. docking bolt; 300. movable frame; 310. frame body; 311. trundle; 320. lifting plate; 321. support frame; 322. support plate; 323. guide shaft; 324. second motor; 325. first ball screw; 326. first nut; 330. sliding table assembly; 331. guide rail; 332. slider; 333. third motor; 334. second ball screw; 340. swivel seat; 341. baseplate; 342. fourth motor; 343. driving gear; 344. driven gear; 345. second torque sensor; 346. connecting plate; 347. positioning component; 350. measuring system; 360. control cabinet; 400. machining assembly; 410. grinding component tool; 420. laser cladding component tool; 430. arc additive component tool; 500. top cover; 501. repair area; 600. support column.

DETAILED DESCRIPTION OF EMBODIMENTS

The disclosure will be further described in conjunction with the embodiments illustrated in the attached drawings.

Embodiment 1

As shown in FIGS. 1-8, a device for repairing a top cover of a hydro turbine by adding or removing materials includes a rotating support base 100, a connecting arm 200, a movable frame 300, and a machining assembly 400. The rotating support base 100 includes a base 110, a rotating seat 120, and a driving assembly 130. The rotating seat 120 is disposed on the base 110, the driving assembly 130 is disposed on the base 110, and an output shaft of the driving assembly 130 is drivably connected to the rotating seat 120. An end of the connecting arm 200 is connected to the rotating seat 120, and the other end of the connecting arm 200 is connected to the movable frame 300. The movable frame 300 includes a lifting plate 320, a sliding table assembly 330, a measuring system 350, and a swivel seat 340. The lifting plate 320 is disposed on movable frame 300, the sliding table assembly 330 is disposed on an upper side of the lifting plate 320, and the measuring system 350 is disposed on the upper side of the lifting plate 320. The swivel seat 340 is disposed on an upper side of the sliding table assembly 330, and the machining assembly 400 is detachably mounted on the swivel seat 340. The movable frame 300 is driven to rotate 360° by the rotating support base 100, the machining assembly 400 is disposed on the movable frame 300, which is capable of replacing different type of machining assemblies for working on the top cover. This results in high quality repair, high precision, and the substitution of machinery for manual labor, reducing the labor intensity for personnel, improving the working environment, and significantly reducing the safety risks associated with manual operations.

When the device is in use, the base 110 is used to fix a central position, the driving assembly 130 is used to drive the rotation of the rotating seat 120, and the rotating seat 120 drives the movable frame 300 to rotate through the connecting arm 200. The lifting plate 320 can be lifted and descended, thereby adjusting the height of the machining assembly 400. The sliding table assembly 330 allows the swivel seat 340 to move along the rotational radius direction of the movable frame 300, thereby adjusting a processing position of the machining assembly 400. The swivel seat 340 can rotate, thereby adjusting a processing direction of the machining assembly 400. The measuring system 350 is used to map and determine the position, size, and depth of defects on the repair area 501. During processing, the lifting plate 320 can adjust the height of the machining assembly 400 in real time through real-time detection by the measuring system 350, thereby eliminating height errors caused by uneven terrain.

Specifically, the measuring system 350 utilizes a vision measurement system model ZNJG-CL03, and a light detection and ranging (LiDAR) measurement system could also be utilized.

Figure 2:
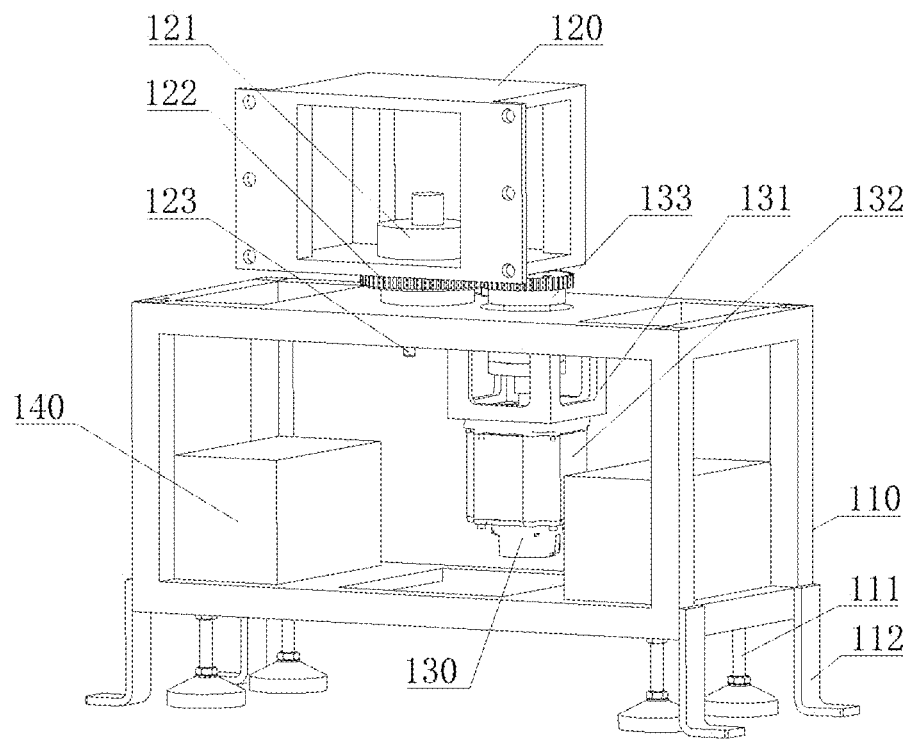
FIG. 2 illustrates a schematic three-dimensional structural diagram of a rotating support base in the disclosure.

As shown in FIG. 2, the base 110 is a frame structure, a bottom of the base 110 is provided with multiple adjustable feet 111, an outer side of the bottom of the base 110 is provided with multiple fixed feet 112, the driving assembly 130 is disposed on an upper side of an interior of the base 110, and a counterweight 140 is placed on a lower side of the interior of the base 110. The level of the rotating support base 100 is adjusted through the multiple adjustable feet 111, and the friction between the multiple adjusting feet 111 and the ground is increased by placing the counterweight 140, thereby ensuring the stability of the base 110.

When the device is in use, the level of the rotating support base 100 is adjusted through the multiple adjustable feet 111. Once a rotation center of the rotating seat 120 is aligned with a center of the top cover 500, then multiple counterweights 140 are placed inside the base 110 to fix the base 110. Additionally, the base 110 can be fixed by connecting the feet bolts with the fixed feet 112.

Specifically, as shown in FIG. 2, the driving assembly 130 includes a motor mounting frame 131, a first motor 132, and a driving gear 133. The motor mounting frame 131 is disposed on an upper side of an interior of the base 110, the first motor 132 is disposed on a lower side of the motor mounting frame 131, the driving gear 133 is disposed on an upper side of the base 110, and the driving gear 133 is drivably connected to an output shaft of the first motor 132. The rotating support base 100 further includes a first torque sensor 121, a driven gear 122 and an encoder 123. The driven gear 122 is disposed on the upper side of the base 110 through a shaft, the driven gear 122 meshes with the driving gear 133, and the rotating seat 120 is located on an upper side of the driven gear 122. The first torque sensor 121 is disposed in the rotating seat 120, and the rotating seat 120 is fixedly connected to the driven gear 122 through the first torque sensor 121, the encoder 123 is disposed on the upper side of the interior of the base 110, and a shaft of the encoder 123 is connected to a shaft of the driven gear 122. Through the structure, the rotation of the rotating seat 120 is achieved, and the first torque sensor 121 utilizes a six-axis force sensor.

When the device is in use, the first motor 132 drives the driving gear 133 to rotate, which in turn drives the driven gear 122. The driven gear 122 is bolted to the first torque sensor 121, and the first torque sensor 121 is bolted to the rotating seat 120, thereby causing the rotating seat 120 to rotate around the shaft of the driven gear 122. The shaft of the driven gear 122 is not shown in the attached drawings. The driven gear 122 is fixedly connected to the shaft, and the shaft is rotatably connected to the base 110 through a bearing housing. The first torque sensor 121 is used to monitor the load condition of the rotating seat 120 in real time; in case of overload, the device alarms and stops, effectively protecting the device. The encoder 123 monitors the operating angle of the rotating seat 120, thus indicating the position of the movable frame 300.

As shown in FIG. 1, a number of the connecting arms 200 is multiple, the multiple connecting arms 200 are connected through docking bolts 210. With the structure described above, not only can the device be conveniently transported, but also different lengths of connecting arm 200 can be replaced according to the varying diameters of the top cover 500, thereby providing the device with better versatility.

Figure 3:
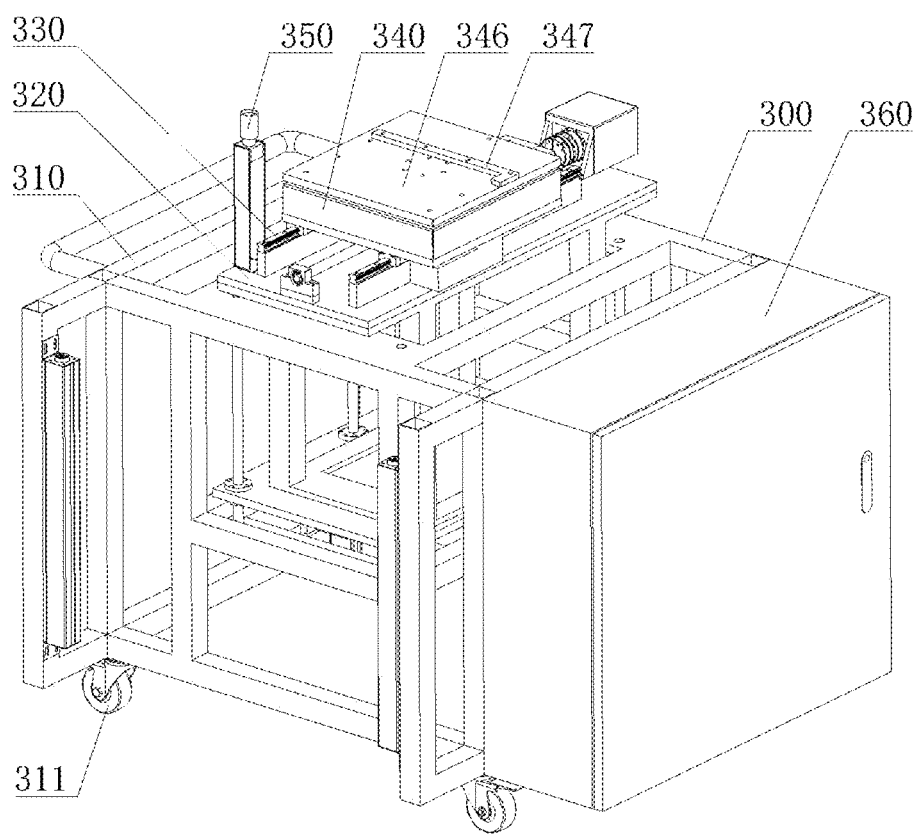
FIG. 3 illustrates a schematic three-dimensional structural diagram of a movable frame in the disclosure.
Figure 4:
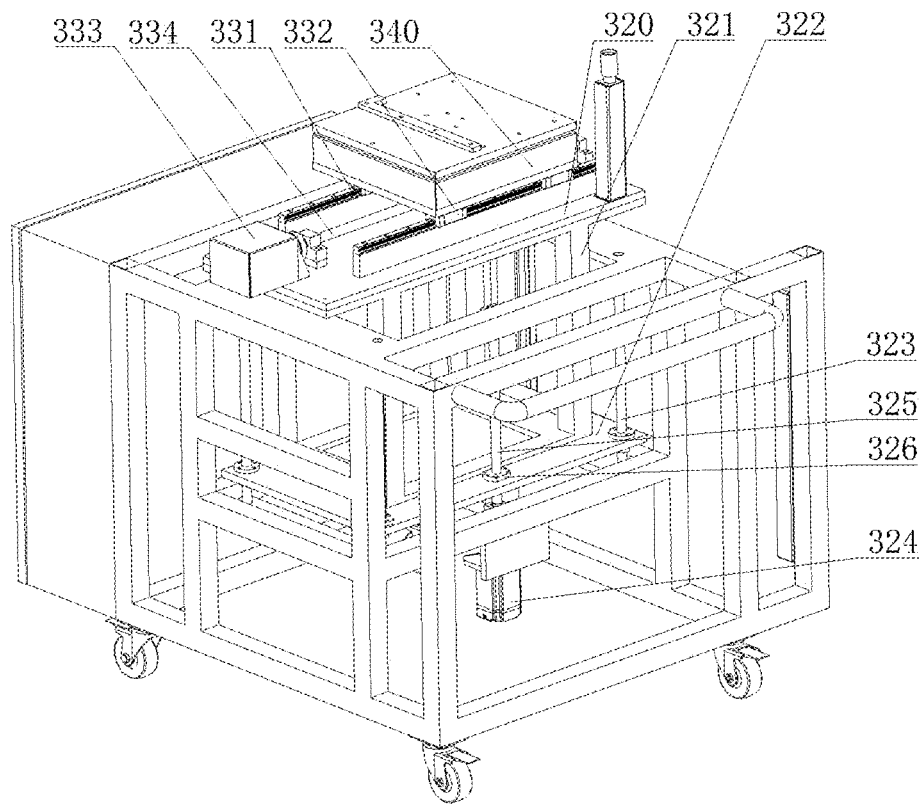
FIG. 4 illustrates another schematic three-dimensional structural diagram of the movable frame in the disclosure.

As shown in FIGS. 3-4, the movable frame 300 includes a frame body 310, trundles 311, and a control cabinet 360. The trundles 311 are disposed at a bottom of the frame body 310, and the control cabinet 360 is disposed at a side of the frame body 310. Specifically, the trundles 311 are four omnidirectional wheels, which can be driven to enable the movable frame 300 to perform circular movements flexibly. The control system is disposed inside the control cabinet 360.

As shown in FIG. 4, the movable frame 300 further includes a support frame 321, a support plate 322, guide shafts 323, a second motor 324, a first ball screw 325, and a first nut 326. The support frame 321 is disposed at a bottom of the lifting plate 320, the support plate 322 is disposed at a bottom of the support frame 321, the guide shafts 323 are longitudinally disposed at four corners of the support plate 322, and the support plate 322 is slidably mounted on the guide shafts 323. the first ball screw 325 is arranged longitudinally, the second motor 324 is arranged longitudinally, an output shaft of the second motor 324 is drivably connected to an end of the first ball screw 325, the first nut 326 is disposed on the support plate 322, and the first nut 324 is threaded onto the first ball screw 325. Through the structure, the lifting adjustment of the lifting plate 320 can be achieved.

When the device is in use, the second motor 324 drives the first ball screw 325 to rotate. Since the first nut 326 is meshed and threaded onto the first ball screw 325, this causes the first nut 326 to move up and down along the first ball screw 325, which in turn drives the support plate 322 to move up and down, and consequently, the lifting plate 320 also moves up and down. Specifically, the support plate 322 is provided with guide sleeves, which are connected with the guide shafts 323 in the sliding fit manner, thereby ensuring the support plate 322 moves stably and maintains a horizontal adjustment.

Figure 5:
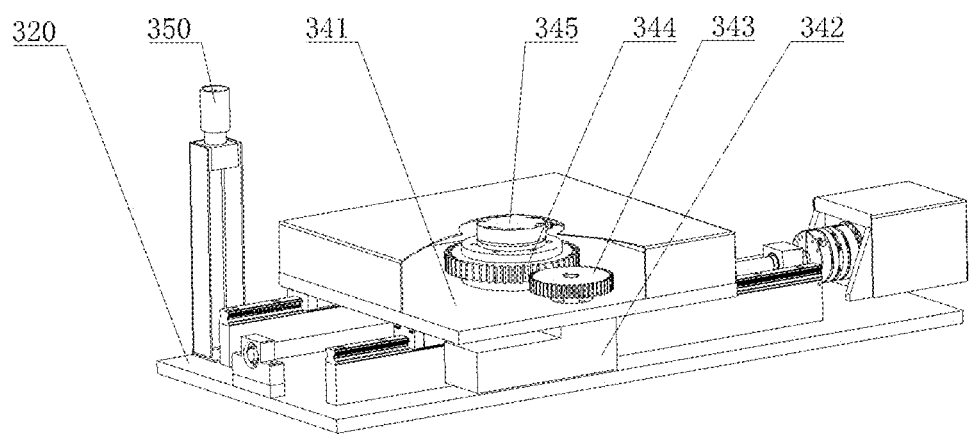
FIG. 5 illustrates a schematic three-dimensional structural diagram of a swivel seat in the disclosure.

As shown in FIGS. 4 and 5, the sliding table assembly 330 includes two guide rails 331, four sliders 332, a third motor 333, a second ball screw 334, and a second nut. The two guide rails 331 are disposed on the lifting plate 320, each guide rail 331 is provided with two of the four sliders 332, the swivel seat 340 is disposed on the four sliders 332, a third motor 333, disposed on the lifting plate 320, and an output shaft of the third motor 333 is drivably connected to an end of the second ball screw 334. The second nut is disposed on a bottom of the swivel seat 340, the second nut is threaded onto the second ball screw 334, and the swivel seat 340 is driven by the third motor 333 to be capable of moving along a rotational radius of the movable frame 300. Through the structure, the swivel seat 340 can move along the rotational radius of the movable frame 300.

When the device is in use, the third motor 333 drives the rotation of the second ball screw 334. The swivel seat 340 is mounted on the four sliders 332, and the bottom of the swivel seat 340 is provided with the second nut. The second nut is connected with the second ball screw 334, thereby driving the swivel seat 340 to move along the two guide rails 331. Specifically, the two guide rails 331 are in a parallel state relative to each other, as well as between each guide rail and the second ball screw 334.

As shown in FIGS. 3 and 5, the swivel seat 340 includes a baseplate 341, a fourth motor 342, a driving gear 343, a driven gear 344, a second torque sensor 345, a connecting plate 346, and a positioning component 347. The fourth motor 342 is disposed on a lower side of the base plate 341, and an output shaft of the fourth motor 342 extends upward from the base plate 341. The output shaft of the fourth motor 342 is provided with the driving gear 343 disposed on a top side of the base plate 341, the driven gear 344 is disposed on the top side of the base plate 341 through a shaft, and the driven gear 344 meshes with the driving gear 343. The second torque sensor 345 is disposed on the top side of the driven gear 344, the connecting plate 346 is disposed on the top side of the second torque sensor 345, the positioning component 347 is disposed on the connecting plate 346, and the machining assembly 400 is disposed on the connecting plate 346. Through the structure, the machining assembly 400 disposed on the swivel seat 340 can rotate.

When the device is in use, the fourth motor 342 drives the rotation of the driving gear 343, which in turn drives the driven gear 344 to rotate. The driven gear 344 causes the second torque sensor 345 to rotate, which then drives the connecting plate 346 to rotate, thereby causing the machining assembly 400 to rotate. The second torque sensor 345 is used to monitor the load condition of the connecting plate 346 in real time; if an overload occurs, the device will trigger an alarm and shut down, effectively protecting the device. Specifically, the connecting plate 346 defines threaded holes, and the machining assembly 400 is mounted on the connecting plate 346 via bolts and the threaded holes. The positioning component 347 is used to locate the machining assembly 400, facilitating the quick installation of the machining assembly. The second torque sensor 345 utilizes a six-axis force sensor.

Figure 6:
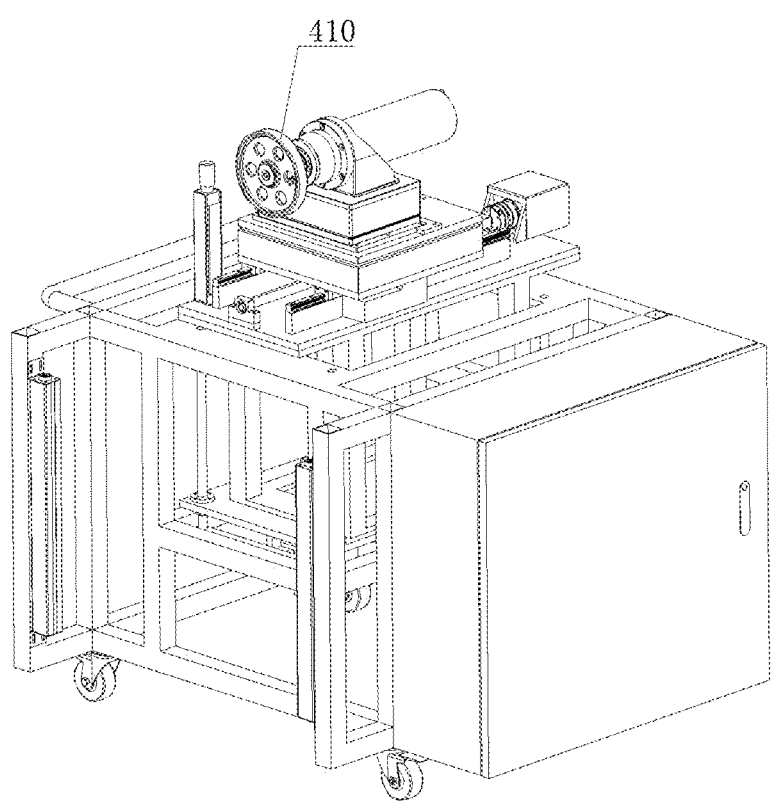
FIG. 6 illustrates a schematic structural diagram of a grinding component tool on the swivel seat in the disclosure.
Figure 7:
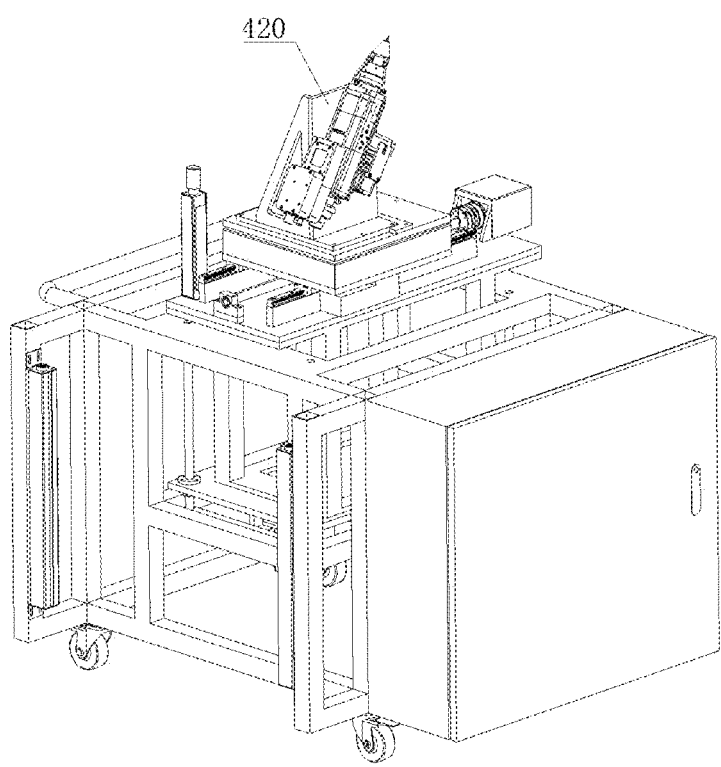
FIG. 7 illustrates a schematic structural diagram of a laser cladding component tool on the swivel seat in the disclosure.
Figure 8:
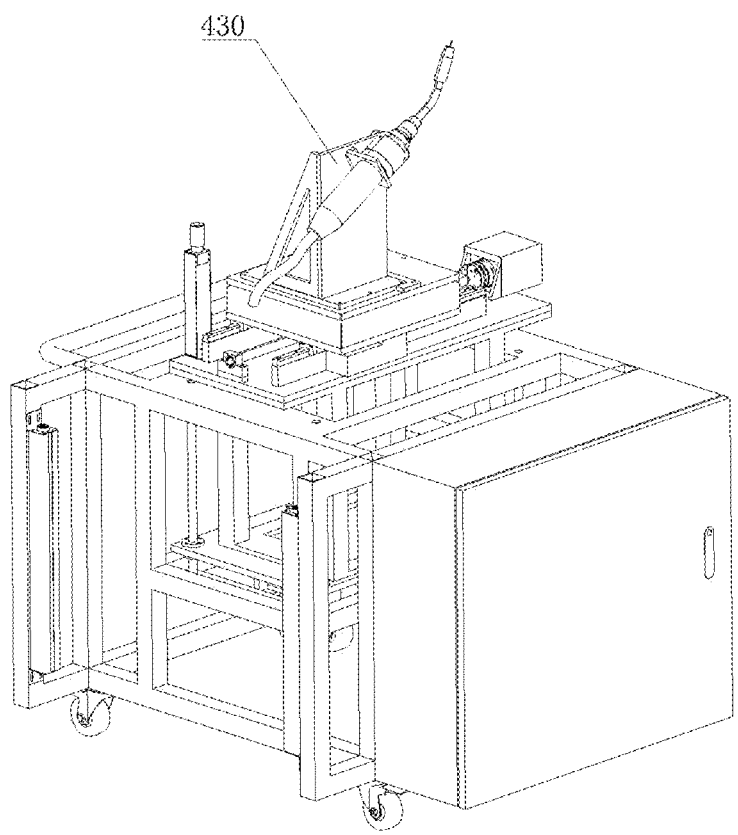
FIG. 8 illustrates a schematic structural diagram of an arc additive component tool on the swivel seat in the disclosure.

As shown in FIGS. 6-8, the machining assembly 400 includes a grinding component tool 410, a laser cladding component tool 420, and an arc additive component tool 430. By utilizing replaceable tools, different stages of the repair work can be achieved, which enhances work efficiency and ensures high processing precision.

Embodiment 2

Figure 9:
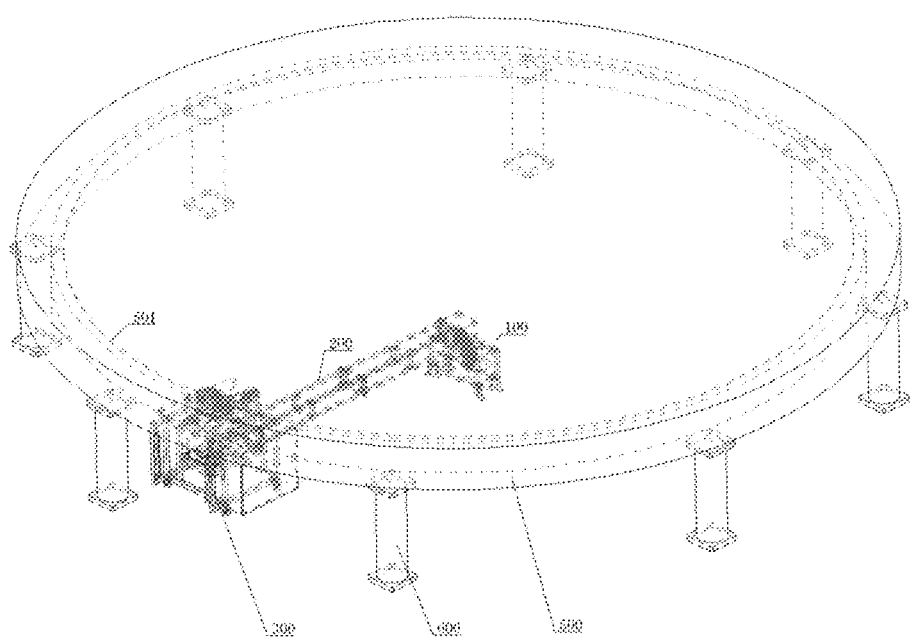
FIG. 9 illustrates a schematic structural diagram of the device in use of the disclosure.

As shown in FIG. 9, a method for repairing a top cover of a hydro turbine by adding or removing materials using the device in the embodiment 1 includes steps as follows.

S1, at least three support columns 600 are placed on ground with a diameter smaller than of the top cover 500, and upper sides of the support columns 600 are on the same horizontal plane.

S2, the top cover 500 is disassembled and lifted onto the at least three support columns 600, the at least three support columns 600 support the top cover 500 without interfering with a repair area 501 located at an edge on a lower side of the top cover 500.

S3, a center of the lower side of the top cover 500 is determined based on a diameter of the top cover 500, and followed by marking the center of the lower side of the top cover 500.

S4, the rotating support base 100 is transported to a bottom of the top cover 500, a rotation center of the rotating seat 120 is aligned with the center of the top cover 500, and followed by fixing the rotating support base 100.

S5, the movable frame 300 is pushed to the lower side of the top cover 500 to close to the edge of the top cover 500, and the end of the connecting arm 200 is bolted to the rotating seat 120, and the other end of the connecting arm 200 is bolted to the movable frame 300.

S6, a height of the lifting plate 320 is adjusted to make the measuring system 350 measure and observe the repair area 501, the driving assembly 130 is activated, the driving assembly 130 drives the rotating seat 120 to rotate, thereby driving the movable frame 300 to rotate through the connecting arm 200. The measuring system 350 performs circular scanning and mapping data on the repair area 501 located at the edge on the lower side of the top cover 500 to obtain scanning and mapping data, and then a control system is controlled to plan a process route based on the scanning and mapping data.

S7, after performing circular scanning and mapping data for one full circle, the driving assembly 130 is turned off and the machining assembly 400 is installed on the swivel seat 340, at this time, a grinding component tool 410 is taken as the machining assembly 400 to be used to adjust a position of the lifting plate 320, thereby making the grinding component tool 410 be in contact with the repair area 501, and the grinding component tool 410 is rotated to grind according to the process route planned by the control system. During the grinding, data is mapped in real time through measuring system 350 to make the control system automatically compensate and correct process route based on deviation values received from feedback. The swivel seat 340 rotates to adjust a grinding angle of the grinding component tool 410, and the sliding table assembly 330 can adjust a grinding position of the grinding component tool 410. During processing, the lifting plate 320 can adjust the height of the machining assembly 400 in real time through real-time detection by the measuring system 350, thereby eliminating height errors caused by uneven terrain.

S8, after the grinding by rotating the grinding component tool 410 for one or more full circles, the driving assembly 130 is turned off and the lifting plate 320 is descended, the grinding component tool 410 on the rotating seat 340 is disassembled, an arc additive component tool 430 taken as the machining assembly 400 is installed on the swivel seat 340, and then the lifting plate 320 is lift to a preset position. The driving assembly 130 is turned on and an arc additive process is performed on the repair area 501 of the top cover 500 by arc additive component tool 430, followed by planning a process route by the control system and controlling a feed speed and an amount of arc welding wire by the control system to meet requirements of the arc additive process.

S9, after performing the arc additive process by rotating the arc additive component tool 430 for one or more full circles, the driving assembly 130 is turned off, the lifting plate 320 is descended, the arc additive component tool 430 on the swivel seat 340 is disassembled, a laser cladding component tool 420 taken as the machining assembly 400 is installed on the swivel seat 340, and then the lifting plate 320 is lift to the preset position. The driving assembly 130 is turned on and a laser cladding process is performed on the repair area 501 of the top cover 500 by the laser cladding component tool 420, The control system plans a process route, measures a thickness of a cladding layer in real-time, and compares the measured thickness with a cladding layer thickness requirement to control an amount of powder feeding.

By replacing different machining assemblies for processing the top cover, the quality of the repair is improved and precision is increased. Replacing manual labor with machinery reduces the physical labor intensity for workers, improves the working environment, and significantly lowers the safety risks associated with manual operations.

What is claimed is:

1. A device for repairing a top cover of a hydro turbine by adding or removing materials, the device comprising: a rotating support base (100), a connecting arm (200), a movable frame (300), and a machining assembly (400);
   wherein the rotating support base (100) comprises:
      a base (110);
      a rotating seat (120), wherein the rotating seat (120) is disposed on the base (110); and
      a driving assembly (130), wherein the driving assembly (130) is disposed on the base (110), and an output shaft of the driving assembly (130) is drivably connected to the rotating seat (120);
   wherein an end of the connecting arm (200) is connected to the rotating seat (120), and an another end of the connecting arm (200) is connected to the movable frame (300);
   wherein the movable frame (300) comprises:
      a lifting plate (320);
      a sliding table assembly (330), wherein the sliding table assembly (330) is disposed on an upper side of the lifting plate (320);
      a measuring system (350), wherein the measuring system (350) is disposed on the upper side of the lifting plate (320); and
      a swivel seat (340), wherein the swivel seat (340) is disposed on an upper side of the sliding table assembly (330), and the machining assembly (400) is detachably mounted on the swivel seat (340).

2. The device for repairing the top cover of the hydro turbine by adding or removing materials as claimed in claim 1, wherein the base (110) is a frame structure, a bottom of the base (110) is provided with a plurality of adjustable feet (111), an outer side of the bottom of the base (110) is provided with a plurality of fixed feet (112), the driving assembly (130) is disposed on an upper side of an interior of the base (110), and a counterweight (140) is placed on a lower side of the interior of the base (110).

3. The device for repairing the top cover of the hydro turbine by adding or removing materials as claimed in claim 2, wherein the driving assembly (130) comprises:

a motor mounting frame (131), wherein the motor mounting frame (131) is disposed on the upper side of the interior of the base (110);
a first motor (132), wherein the first motor (132) is disposed on a lower side of the motor mounting frame (131); and
a driving gear (133), wherein the driving gear (133) is disposed on an upper side of the base (110), and the driving gear (133) is drivably connected to an output shaft of the first motor (132);
wherein the rotating support base (100) further comprises:
a driven gear (122), wherein the driven gear (122) is disposed on the upper side of the base (110) through a shaft, the driven gear (122) meshes with the driving gear (133), and the rotating seat (120) is located on an upper side of the driven gear (122);
a first torque sensor (121), wherein the first torque sensor (121) is disposed in the rotating seat (120), and the rotating seat (120) is fixedly connected to the driven gear (122) through the first torque sensor (121); and
an encoder (123), wherein the encoder (123) is disposed on the upper side of the interior of the base (110), and a shaft of the encoder (123) is connected to a shaft of the driven gear (122).

4. The device for repairing the top cover of the hydro turbine by adding or removing materials as claimed in claim 1, wherein the driving assembly (130) comprises:
a motor mounting frame (131), wherein the motor mounting frame (131) is disposed on an upper side of an interior of the base (110);
a first motor (132), wherein the first motor (132) is disposed on a lower side of the motor mounting frame (131); and
a driving gear (133), wherein the driving gear (133) is disposed on an upper side of the base (110), and the driving gear (133) is drivably connected to an output shaft of the first motor (132);
wherein the rotating support base (100) further comprises:
a driven gear (122), wherein the driven gear (122) is disposed on the upper side of the base (110) through a shaft, the driven gear (122) meshes with the driving gear (133), and the rotating seat (120) is located on an upper side of the driven gear (122);
a first torque sensor (121), wherein the first torque sensor (121) is disposed in the rotating seat (120), and the rotating seat (120) is fixedly connected to the driven gear (122) through the first torque sensor (121); and
an encoder (123), wherein the encoder (123) is disposed on the upper side of the interior of the base (110), and a shaft of the encoder (123) is connected to a shaft of the driven gear (122).

5. The device for repairing the top cover of the hydro turbine by adding or removing materials as claimed in claim 1, wherein a number of the connecting arm (200) is multiple, and the multiple connecting arms (200) are connected through docking bolts (210).

6. The device for repairing the top cover of the hydro turbine by adding or removing materials as claimed in claim 1, wherein the movable frame (300) further comprises:
a frame body (310),
trundles (311), wherein the trundles (311) are disposed at a bottom of the frame body (310); and
a control cabinet (360), wherein the control cabinet (360) is disposed at a side of the frame body (310).

7. The device for repairing the top cover of the hydro turbine by adding or removing materials as claimed in claim 1, wherein the sliding table assembly (330) comprises:

two guide rails (331), wherein the two guide rails (331) are disposed on the lifting plate (320);
four sliders (332), wherein each guide rail (331) is provided with two of the four sliders (332), and the swivel seat (340) is disposed on the four sliders (332);
a third motor (333), disposed on the lifting plate (320);
a second ball screw (334), disposed on the lifting plate (320); wherein an output shaft of the third motor (333) is drivably connected to an end of the second ball screw (334); and
a second nut, disposed on a bottom of the swivel seat (340); wherein the second nut is threaded onto the second ball screw (334), and the swivel seat (340) is driven by the third motor (333) to be capable of moving along a rotational radius of the movable frame (300).

8. The device for repairing the top cover of the hydro turbine by adding or removing materials as claimed in claim 1, wherein the swivel seat (340) comprises:
a baseplate (341),
a fourth motor (342), wherein the fourth motor (342) is disposed on a lower side of the base plate (341), and an output shaft of the fourth motor (342) extends upward from the base plate (341);
a driving gear (343), wherein the driving gear (343) is disposed on an upper side of the base plate (341) and disposed at the output shaft of the fourth motor (342);
a driven gear (344), wherein the driven gear (344) is disposed on the upper side of the base plate (341) through a shaft, and the driven gear (344) meshes with the driving gear (343);
a second torque sensor (345), wherein the second torque sensor (345) is disposed on an upper side of the driven gear (344);
a connecting plate (346), wherein the connecting plate (346) is disposed on an upper side of the second torque sensor (345); and
a positioning component (347), wherein the positioning component (347) is disposed on the connecting plate (346), and the machining assembly (400) is disposed on the connecting plate (346).

9. The device for repairing the top cover of the hydro turbine by adding or removing materials as claimed in claim 7, wherein the two guide rails (331) and the second ball screw (334) are parallel to each other.

10. The device for repairing the top cover of the hydro turbine by adding or removing materials as claimed in claim 7, wherein the swivel seat (340) comprises:
a baseplate (341),
a fourth motor (342), wherein the fourth motor (342) is disposed on a lower side of the base plate (341), and an output shaft of the fourth motor (342) extends upward from the base plate (341);
a driving gear (343), wherein the driving gear (343) is disposed on an upper side of the base plate (341) and disposed at the output shaft of the fourth motor (342);
a driven gear (344), wherein the driven gear (344) is disposed on the upper side of the base plate (341) through a shaft, and the driven gear (344) meshes with the driving gear (343);
a second torque sensor (345), wherein the second torque sensor (345) is disposed on an upper side of the driven gear (344);
a connecting plate (346), wherein the connecting plate (346) is disposed on an upper side of the second torque sensor (345); and a positioning component (347), wherein the positioning component (347) is disposed on the connecting plate (346), and the machining assembly (400) is disposed on the connecting plate (346).

11. The device for repairing the top cover of the hydro turbine by adding or removing materials as claimed in claim 6, wherein the trundles (311) are four omnidirectional wheels.

12. The device for repairing the top cover of the hydro turbine by adding or removing materials as claimed in claim 1, wherein the machining assembly (400) comprises:
   a grinding component tool (410), a laser cladding component tool (420), and an arc additive component tool (430).

13. The device for repairing the top cover of the hydro turbine by adding or removing materials as claimed in claim 8, wherein the first torque sensor (121) and the second torque sensor (345) are six-axis force sensors.

14. The device for repairing the top cover of the hydro turbine by adding or removing materials as claimed in claim 1, wherein the movable frame (300) further comprises:

a support frame (321), wherein the support frame (321) is disposed at a bottom of the lifting plate (320);

a support plate (322), wherein the support plate (322) is disposed at a bottom of the support frame (321);

guide shafts (323), wherein the guide shafts (323) are longitudinally disposed at four corners of the support plate (322), and the support plate (322) is slidably mounted on the guide shafts (323);

a first ball screw (325), wherein the first ball screw (325) is arranged longitudinally;

a second motor (324), wherein the second motor (324) is arranged longitudinally, and an output shaft of the second motor (324) is drivably connected to an end of the first ball screw (325); and a first nut (326), disposed on the support plate (322), wherein the first nut (326) is threaded onto the first ball screw (325).

* * * * *